United States Patent [19]

Carroll et al.

[11] Patent Number: 5,055,989
[45] Date of Patent: Oct. 8, 1991

[54] THREE PHASE TO SINGLE PHASE CONVERTER

[75] Inventors: Lawrence B. Carroll, Endwell; Kenneth H. Kidder, Jr., Endicott; Thomas Visentin, Wappingers Falls, all of N.Y.

[73] Assignee: International Business Machines Corporation, Armonk, N.Y.

[21] Appl. No.: 575,577

[22] Filed: Aug. 31, 1990

[51] Int. Cl.⁵ .......................................... H02M 5/458
[52] U.S. Cl. ...................................... 363/36; 363/37; 363/87; 363/98
[58] Field of Search ..................... 363/36, 37, 87, 98; 361/85

[56] References Cited

U.S. PATENT DOCUMENTS

| 26,641 | 8/1969 | Corey | 363/36 |
|---|---|---|---|
| 3,636,298 | 1/1972 | Risberg et al. | 363/36 |
| 3,737,755 | 6/1973 | Calkin et al. | |
| 4,314,322 | 2/1982 | Plow et al. | 363/87 |
| 4,866,592 | 9/1989 | Fujii et al. | 363/36 |

Primary Examiner—William H. Beha, Jr.
Assistant Examiner—Adolf Berhane
Attorney, Agent, or Firm—Pollock, Vande Sande & Priddy

[57] ABSTRACT

A three phase A.C. to single phase A.C. converter wherein the output voltage is not disturbed if one of the input phase lines becomes inoperative. The three phase A.C. is first rectified, and a D.C. voltage is derived from the resulting rectified D.C. current. The D.C. voltage is regulated, and a single phase A.C. voltage is generated from the regulated D.C. voltage.

7 Claims, 3 Drawing Sheets

THREE PHASE TO SINGLE PHASE CONVERTER

DESCRIPTION

Technical Field

The present invention is directed to an improved power supply, and particularly to a power supply for providing single phase A.C. power from three phase lines.

BACKGROUND OF THE INVENTION

For certain applications it is necessary to provide single phase A.C. from three phase lines. For example, a mainframe computer may be designed to operate on three phase power because of its increased reliability, while peripheral equipment to be used in connection with the computer would typically be designed to operate on single phase. In such a case, the single phase may be obtained from two of the three phase lines.

However, in such an arrangement, a problem arises if the single phase to which the peripheral equipment is connected is interrupted. Thus, due to the provision of voltage regulation, the computer will continue to operate satisfactorily on two phases, but the peripheral equipment may be lost altogether. Since the loss of peripheral equipment could render the system useless, it is important to ensure that such equipment continues to operate when a single phase of the three phase power source is lost.

SUMMARY OF THE INVENTION

It is thus the object of the present invention to provide a three phase to single phase converter which provides a single phase output which is not disturbed when an input phase is lost.

This object is accomplished by providing means for rectifying the three phase input to provide a D.C. current, means for deriving a D.C. voltage from the D.C. current, means for regulating the D.C. voltage, and means for generating a single phase A.C. output voltage from the regulated D.C. voltage.

In the preferred embodiment of the invention, the D.C. voltage is obtained on a storage capacitor, and the single phase A.C. output voltage is regulated to compensate for load variations. Also, the single phase A.C. output is obtained by first generating a rectified sine wave voltage, and then passing such voltage through an unrectifier circuit.

BRIEF DESCRIPTION OF THE DRAWINGS

The invention will be better understood by referring to the accompanying drawings, wherein.

DESCRIPTION OF A PREFERRED EMBODIMENT

Figure 1:
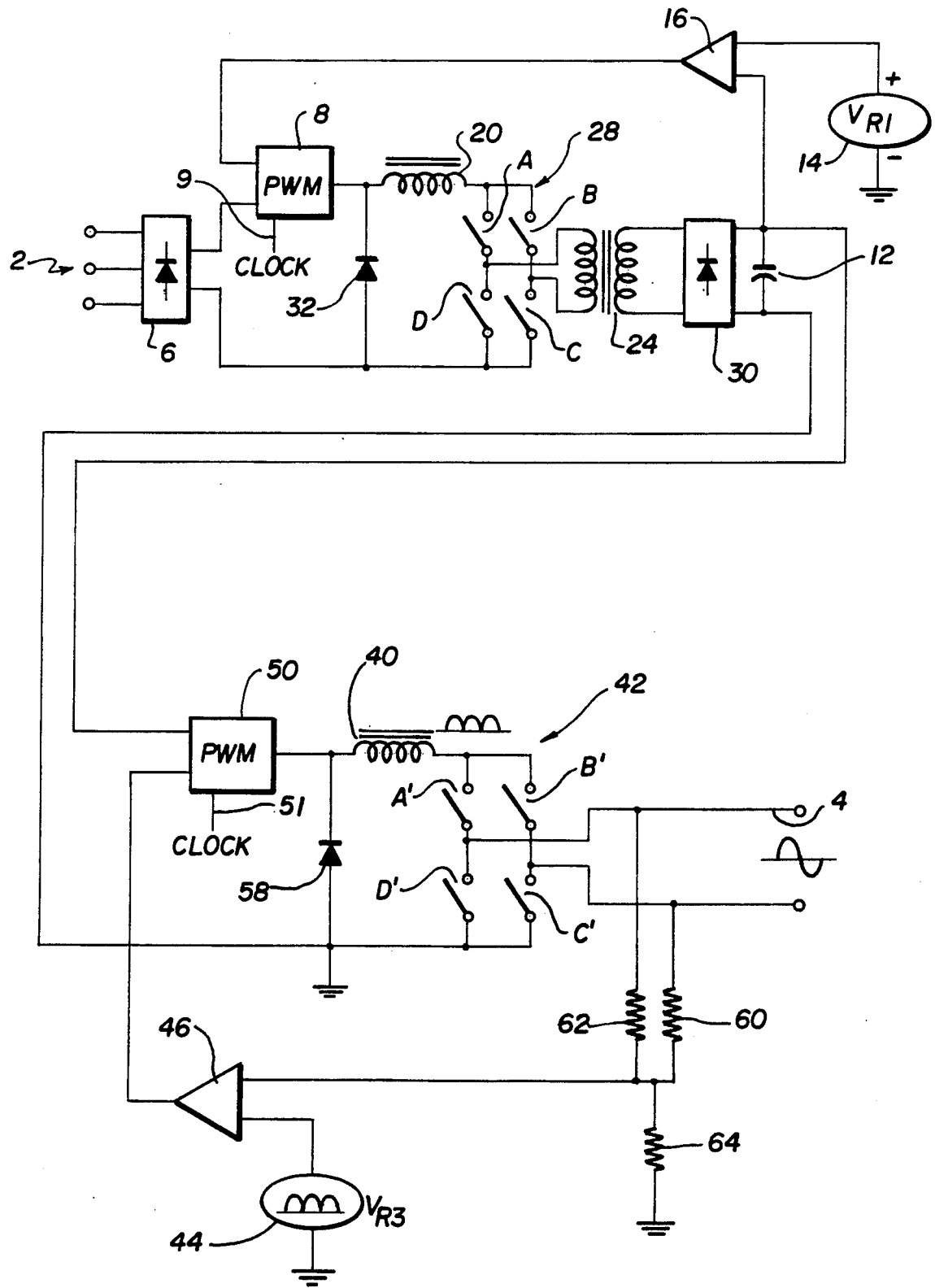
FIG. 1 is a circuit diagram of an embodiment of the invention.

Referring to FIG. 1, three phase input lines 2 are depicted. The nominal voltage of such lines as well as the voltage variation during operation may vary substantially, as the system provides a regulated output. The object of the system is to provide a constant single phase A.C. output voltage 4 notwithstanding variations in input voltage, and even in the event that one of the input phases is completely lost.

To this end, the input lines 2 are fed to three phase rectifier 6, which may be a standard six diode, three phase rectifying arrangement, resulting in a D.C. current output. The D.C. current is fed to pulse width modulator 8, which is toggled at a high frequency, e.g., 40 Khz, at clock input 9. Specific circuitry which may be used for the pulse width modulator is well known, and for example, is shown in U.S. Pat. No. 3,737,755.

The pulse width modulator 8 is part of the voltage regulation arrangement of the D.C. to D.C. part of the system. Thus, the first part of the circuitry produces a D.C. voltage across capacitor 12, and this voltage is regulated by components including reference voltage generator 14, comparator 16, and the pulse width modulator 8. More specifically, voltage regulation is effected by providing a reference voltage which is emitted by generator 14, comparing the voltage across capacitor 12 with the reference voltage in comparator 16, and thereby providing a difference voltage for driving pulse width modulator 8.

Thus, a pulse width modulated square wave is fed from the output of pulse width modulator 8 to input inductor 20, which filters the pulse frequency, thereby resulting in a D.C. current, the magnitude of which varies in accordance with the regulation which is introduced by modulator 8. Capacitor 12 could be physically connected to inductor 20, but it typically is necessary to change the voltage level, and for this purpose transformer 24 is used. More particularly, the current from the inductor is fed to full wave chopper 28 to convert it to A.C., and the resulting A.C. is fed to transformer 24. The output of transformer 24 is rectified by rectifier 30, before being fed to capacitor 12.

Figure 2:
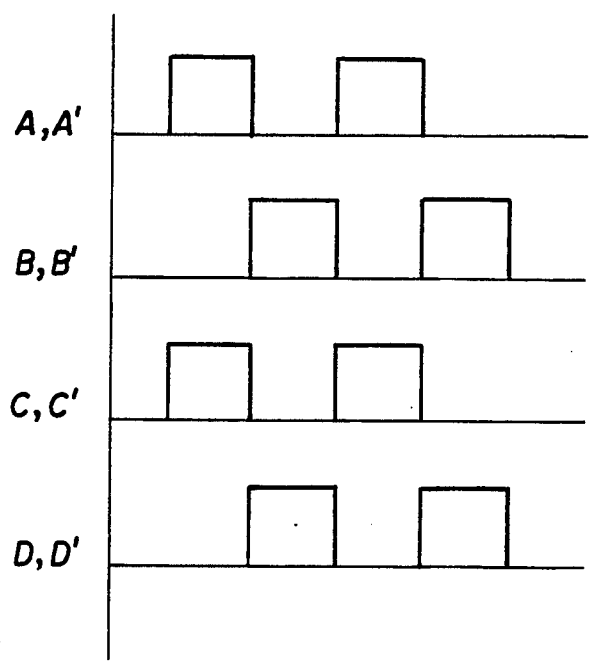
FIG. 2 shows the toggling sequence for the full wave chopper and unrectifier circuits of FIG. 1.

Full wave chopper 28 is operated by alternately closing switches A and C together, and then switches B and D together. This causes the current to flow first in one direction through the transformer and then in the other direction, creating the requisite A.C. current. The pulse sequencing of the switches A, B, C, and D of chopper 28 is shown in FIG. 2, and in order to reduce the size of transformer 24, the chopper may be toggled at a relatively high rate. For example, in the preferred embodiment, the respective half sections of the chopper are each toggled at 20 Khz. Specific circuitry which may be employed in the full wave chopper is well known, and is, for example, disclosed in the above-mentioned U.S. Pat. No. 3,737,755. To complete the circuitry in the D.C. to D.C. converter part of the system, free wheeling diode 32 is provided to ensure that the current in inductor 20 is continuous.

In accordance with the present invention, single phase A.C. is generated from the regulated D.C. voltage which is provided across capacitor 12. Briefly, this is effected by causing a rectified sine wave current to be derived from the D.C. voltage at the output of inductor 40, and feeding the rectified sine wave current to an unrectifier means 42 for converting it to A.C.

Referring to FIG. 1, signal generator 44 is provided for generating a rectified sine wave voltage at a frequency of twice the desired frequency of the output voltage, i.e., at 120 hz where the desired frequency of the output voltage is 60 hz. This voltage is fed to one input of comparator 46, while the other input is a signal which is derived from the single phase A.C. output through resistive dividing arrangement 60, 62, 64. This signal is also a rectified sine wave, the magnitude of which corresponds to the magnitude of the single phase output voltage. Thus, the output of comparator 46 is a rectified sine wave, the magnitude of which corresponds to the degree of voltage regulation which is necessary.

The output of comparator 46 drives pulse width modulator 50, which is preferably toggled at a relatively high frequency, e.g., 40 Khz. Inductor 40 filters the high frequency, thereby providing a rectified sine wave at the same frequency as provided by signal generator 44, e.g., 120 hz, and having an amplitude which is determined by the degree of voltage regulation which is introduced by comparator 46.

This rectified sine wave voltage is fed to unrectifier 42, which converts it to A.C. In the operation of the unrectifier, respective switch pairs A', C', and B', D' are alternately toggled as shown in connection with the waveform diagram of FIG. 2. Each pair is toggled at the desired frequency of the output voltage, e.g., 60 hz, which causes a single phase regulated, A.C. output to appear on output lines 4. Free wheeling diode 58 is provided to ensure that the current through induction 40 is continuous, and a filter capacitor may be connected between the inductor and diode 58.

It is noted that the signal for toggling unrectifier 42, as well as the signals for driving rectified sine wave voltage generators 44 and 62 are derived from the same clock source, so as to be synchronized with each other. In an actual embodiment, a master clock would be provided, and all switching frequency signals would be derived from the master clock.

Thus, in accordance with the invention, a single phase A.C. output is provided which is not disturbed when the input voltage changes, or when an input phase is lost. If this should occur, the regulated D.C. voltage across capacitor 12 will remain the same, and thus so will the single phase A.C. output voltage on lines 4.

Figure 3:
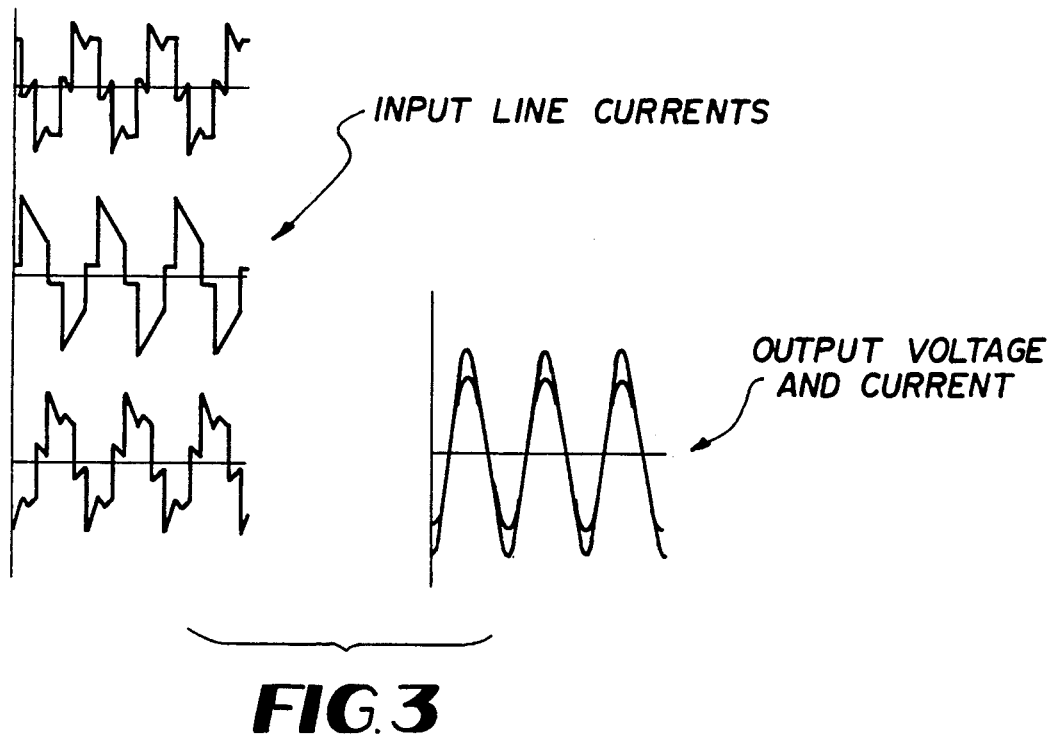
FIG. 3 shows the three phase current inputs and the voltage and current output at full load.
Figure 4:
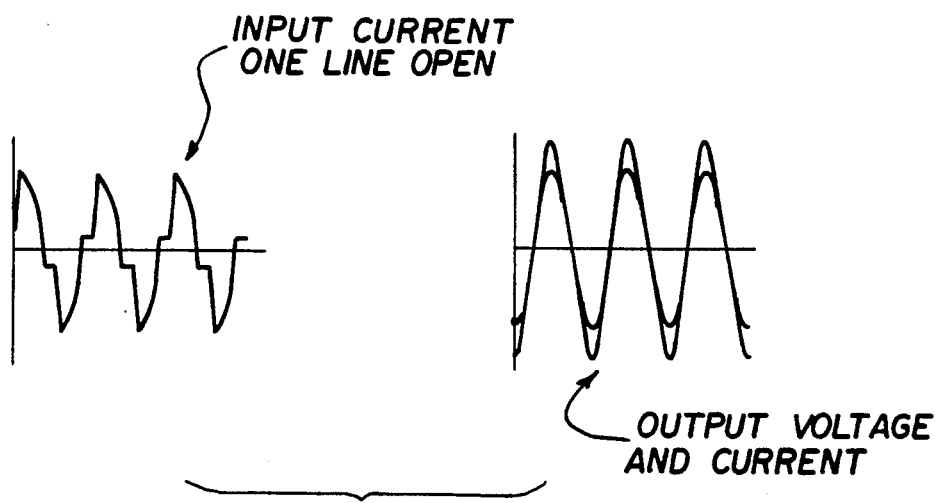
FIG. 4 shows the input current when an input phase is lost, and the voltage and current output at full load.

In this regard, FIG. 3 illustrates the input line currents of the three phases, and the output voltage and current at full load. FIG. 4 shows an input phase current when one input phase is open, along with the output voltage and current at full load during this condition. It is seen that the output voltage and current are not disturbed when an input phase is lost, as they are substantially the same in both FIGS. 3 and 4.

Figure 5:
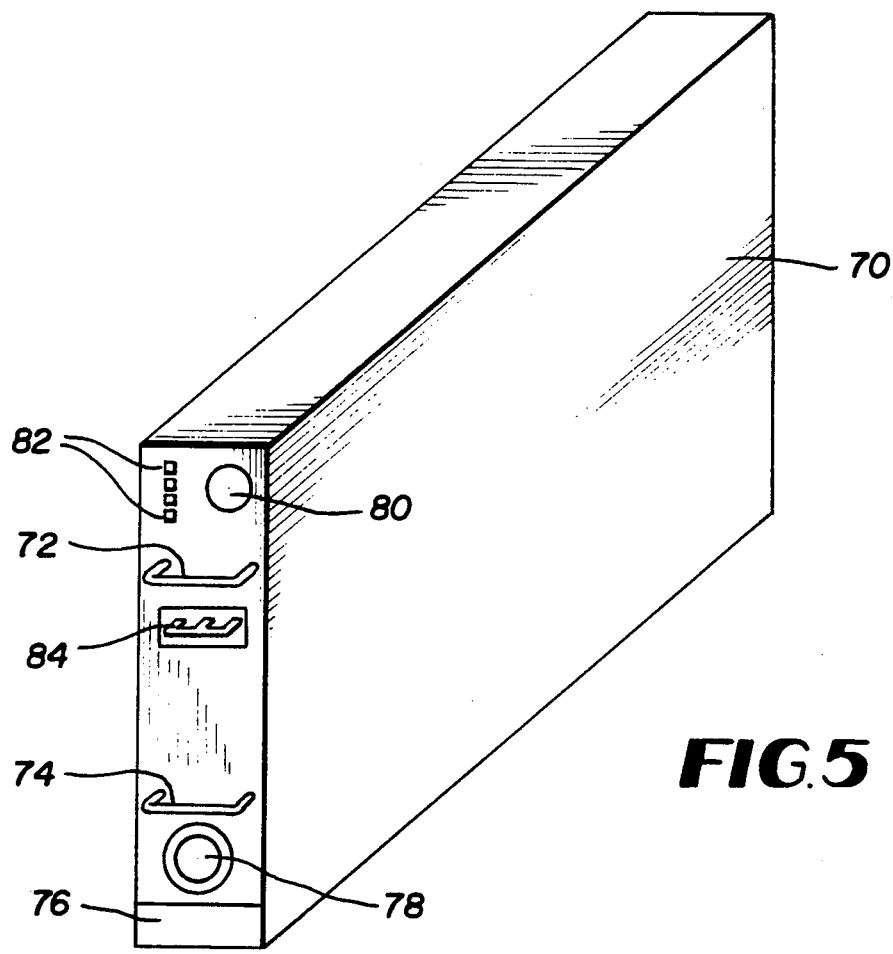
FIG. 5 is a pictorial illustration of the packaging for the apparatus.

FIG. 5 is an illustration of packaging for the power supply of the invention. It will be noted that the circuitry is disposed in a rectangular metal case 70 having handles 72 and 84. A removable fan assembly 76 is provided to allow easy replacement in the event of a failure. The unit is arranged so that it will not operate with the fan assembly pulled out or with a failed fan.

The three phase input connector 78 and single phase output connector 80 are provided, as are LED status indicators 82, which indicate undervoltage, overvoltage, and overcurrent conditions, as well as normal operation. A circuit breaker 84 provides turn on/turn off of the unit and primary circuit protection.

Thus, a three phase to single phase converter in accordance with the invention has been described. While the invention has been disclosed in connection with an illustrative embodiment, it should be appreciated that the invention is to be limited only by the claims appended hereto and equivalents.

Having thus described our invention, what we claim as new and desire to secure by Letters Patent is:

1. Apparatus for converting a three phase input to a single phase output wherein loss of one of the three phase input lines will not adversely affect the single phase output, comprising, means for rectifying the three phase input for providing a D.C. current, means for deriving a D.C. voltage across a storage capacitor from said D.C. current, means for regulating the D.C. voltage across said capacitor, which comprises first voltage regulating means which is responsive to the magnitude of said D.C. voltage for modulating said D.C. current to tend to keep said D.C. voltage constant, means for generating a single phase A.C. output voltage from said regulated D.C. voltage, which comprises means for providing a rectified sine wave voltage, and means for feeding said rectified sine wave voltage to an unrectifier means for providing said A.C. output voltage, and second voltage regulating means for regulating said single phase A.C. output voltage.

2. The apparatus of claim 1 wherein said second voltage regulating means includes a pulse width modulator and a filter means.

3. The apparatus of claim 2 wherein said means for providing said rectified sine wave voltage further includes means for generating a rectified sine wave voltage and means for causing the duty cycle which is effected by said pulse width modulator to be controlled with said rectified sine wave voltage which is generated, or with a signal which is derived therefrom.

4. The apparatus of claim 3 wherein said means for providing said rectified sine wave voltage provides such voltage at twice the desired frequency of the single phase A.C. output voltage, and wherein the unrectifier means is toggled at the desired frequency of the output voltage.

5. The apparatus of claim 4 wherein said first voltage regulating means includes a pulse width modulator and an inductor.

6. The apparatus of claim 5 further comprising, full wave chopper means connected to said inductor, and a transformer which has a primary winding which is connected to the output of said full wave chopper means, and a secondary winding which is connected through rectifier means to said storage capacitor.

7. The apparatus of claim 6, which is contained in a housing having the shape of a rectangular solid, and wherein a three phase input connector, a single phase output connector, circuit breaker means, a handle, and status indicators are all located at one end of the rectangular solid.

* * * * *